United States Patent
Walker (10) Patent No.: US 9,940,247 B2
(45) Date of Patent: Apr. 10, 2018

(54) CONCURRENT ACCESS TO CACHE DIRTY BITS

(75) Inventor: William L. Walker, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 1183 days.

(21) Appl. No.: 13/533,253

(22) Filed: Jun. 26, 2012

(65) Prior Publication Data

US 2013/0346699 A1 Dec. 26, 2013

(51) Int. Cl.
| | |
|---|---|
| *G06F 12/00* | (2006.01) |
| *G06F 13/00* | (2006.01) |
| *G06F 13/28* | (2006.01) |
| *G06F 12/0893* | (2016.01) |
| *G06F 12/0891* | (2016.01) |
| *G06F 12/0815* | (2016.01) |

(52) U.S. Cl.
CPC ...... *G06F 12/0893* (2013.01); *G06F 12/0815* (2013.01); *G06F 12/0891* (2013.01)

(58) Field of Classification Search
CPC .. G06F 12/0804; G06F 9/3814; G06F 9/3816; G06F 12/0815; G06F 12/0891
USPC ........ 711/128, 113, 118, 120, 131, 135, 143, 711/144, E12.04, 156
See application file for complete search history.

(56) References Cited

U.S. PATENT DOCUMENTS

| | | | |
|---|---|---|---|
| 2002/0069331 A1* | 6/2002 | Chauvel et al. | 711/144 |
| 2003/0135701 A1* | 7/2003 | Middleton et al. | 711/156 |
| 2004/0015669 A1* | 1/2004 | Edirisooriya | G06F 12/126 711/163 |
| 2013/0046933 A1* | 2/2013 | Le et al. | 711/118 |
| 2014/0040550 A1* | 2/2014 | Nale et al. | 711/118 |

\* cited by examiner

*Primary Examiner* — Daniel C Chappell
*Assistant Examiner* — Shane Woolwine (57) ABSTRACT

The present application describes embodiments of a method and apparatus for concurrently accessing dirty bits in a cache. One embodiment of the apparatus includes a cache configurable to store a plurality of lines. The lines are grouped into a plurality of subsets the plurality of lines. This embodiment of the apparatus also includes a plurality of dirty bits associated with the plurality of lines and first circuitry configurable to concurrently access the plurality of dirty bits associated with at least one of the plurality of subsets of lines.

14 Claims, 8 Drawing Sheets

Figure 7 ated L2 cache, microcode first flushes the L1 cache by writing dirty cache lines into the L2 cache or main memory. Once flushing of the L1 cache is complete, the microcode flushes the L2 cache by writing dirty cache lines into the main memory. Caches may also be "rinsed" by writing back one or more modified or "dirty" cache lines to the main memory and not invalidating the lines that are written back. Rinsing may be performed in the background and typically writes back a few lines in the cache to make these lines "clean," but the other cache values are left in their current states.

CONCURRENT ACCESS TO CACHE DIRTY BITS

BACKGROUND

The claimed subject matter relates generally to processor-based systems, and, more particularly, to concurrent access to cache dirty bits.

Many processing devices utilize caches to reduce the average time required to access information stored in a memory. A cache is a smaller and faster memory that stores copies of instructions and/or data that are expected to be used relatively frequently. For example, central processing units (CPUs) are generally associated with a cache or a hierarchy of cache memory elements. Processors other than CPUs, such as, for example, graphics processing units and others, are also known to use caches. Instructions or data that are expected to be used by the CPU are moved from (relatively large and slow) main memory into the cache. When the CPU needs to read or write a location in the main memory, it first checks to see whether the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the latency of memory accesses below the latency of the main memory to a value close to the value of the cache memory.

One widely used architecture for a CPU cache memory is a hierarchical cache that divides the cache into two levels known as the L1 cache and the L2 cache. The L1 cache is typically a smaller and faster memory than the L2 cache, which is smaller and faster than the main memory. The CPU first attempts to locate needed memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed near entities that require more frequent access to instructions than data, whereas the L1-D can be placed closer to entities that require more frequent access to data than instructions. The L2 cache is typically associated with both the L1-I and L1-D caches and can store copies of instructions or data that are retrieved from the main memory. Frequently used instructions are copied from the L2 cache into the L1-I cache and frequently used data can be copied from the L2 cache into the L1-D cache. The L2 cache is therefore referred to as a unified cache.

Caches are typically flushed prior to powering down the CPU. Flushing includes writing back modified or "dirty" cache lines to the main memory and invalidating all of the lines in the cache. Microcode can be used to sequentially flush different cache elements in the CPU cache. For example, in conventional processors that include an integrated L2 cache, microcode first flushes the L1 cache by writing dirty cache lines into the L2 cache or main memory. Once flushing of the L1 cache is complete, the microcode flushes the L2 cache by writing dirty cache lines into the main memory. Caches may also be "rinsed" by writing back one or more modified or "dirty" cache lines to the main memory and not invalidating the lines that are written back. Rinsing may be performed in the background and typically writes back a few lines in the cache to make these lines "clean," but the other cache values are left in their current states.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, an apparatus is provided for concurrently accessing dirty bits in a cache. One embodiment of the apparatus includes a cache configurable to store a plurality of lines. The lines are grouped into a plurality of subsets of the plurality of lines. This embodiment of the apparatus also includes a plurality of dirty bits associated with the plurality of lines and first circuitry configurable to concurrently access the plurality of dirty bits associated with at least one of the plurality of subsets of lines.

In another embodiment, a method is provided for concurrently accessing dirty bits in a cache. One embodiment of the method includes storing a plurality of lines in a cache. The lines are grouped into a plurality of subsets of the plurality of lines. This embodiment of the method also includes storing values of a plurality of dirty bits associated with the plurality of lines and concurrently accessing the values of the plurality of dirty bits associated with one or more of the plurality of subsets of lines.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Dirty lines in a cache may be written back to a main memory during flushing or rinsing of the cache. As used herein, the term "flush" is used to describe a process in which the dirty bit of a cache line is examined and if the cache line is clean, the flush process invalidates line. If the cache line is dirty, the flush process copies the contents of the cache line to another memory or cache and then invalidates the line. As used herein, the term "rinse" is used to describe a process in which the dirty bit of a cache line is examined and if the cache line is clean nothing is done. If the cache line is dirty, the rinse process copies the contents of the cache line to another memory or cache, marks the line as "clean," and does not invalidate the line. One conventional approach for flushing or rinsing a cache is to serially probe each way associated with each index of a cache line. For example, for each index, way 0 is probed and written back to main memory if the "dirty bit" for the way indicates that the way includes a dirty cache line, then way 1 is probed and written back if the dirty bit is set, then way 2, etc. Serial access to the different ways has been implemented to accommodate limitations in the physical structure of the memory elements that are typically used to store the cache. For example, conventional caches may be stored in static random access memory (SRAM) so that only one address or location in the SRAM array (which corresponds to one index/way) can be probed at a time. Probing addresses one a time reduces the performance of the flush and rinse operations, e.g. by slowing down the flush or rinse operation.

Embodiments of the storage structures for the cache line dirty bits described in the present application allow the dirty bits for multiple ways to be read out concurrently or in parallel in response to a probe. In one embodiment, the cache may be n-way associative (i.e., each index in the cache is associated with n ways) and so the n dirty bits associated with each index can be accessed concurrently. For example, a parallel read of the dirty bits can be implemented in systems that use flip-flops to store the dirty bits because each flip-flop can be accessed independently and multiple flip-flops can be accessed concurrently or in parallel. A speedup of as much as n-times over the conventional serial approach can be achieved for an n-way associative cache, e.g., when all of the ways associated with an index are clean and none of the ways include dirty cache lines that need to be written back to the main memory.

Figure 1:
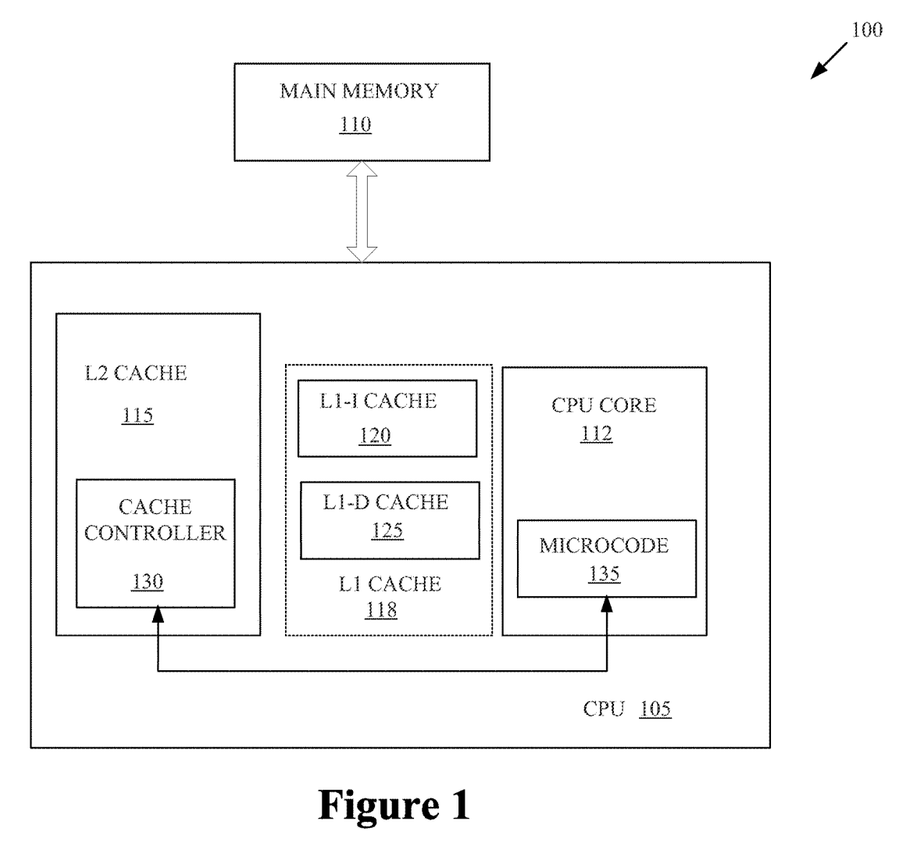
FIG. 1 conceptually illustrates one exemplary embodiment of a semiconductor device that may be formed in or on a semiconductor wafer.

FIG. 1 conceptually illustrates one exemplary embodiment of a semiconductor device 100 that may be formed in or on a semiconductor wafer (or die). The semiconductor device 100 may formed in or on the semiconductor wafer using well known processes such as deposition, growth, photolithography, etching, planarising, polishing, annealing, and the like. In the illustrated embodiment, the device 100 includes a central processing unit (CPU) 105 that is configured to access instructions and/or data that are stored in the main memory 110. In the illustrated embodiment, the CPU 105 includes a CPU core 112 that is used to execute the instructions and/or manipulate the data. The CPU 105 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 100 may implement different configurations of the CPU 105, such as configurations that use external caches or different types of processors (e.g., GPUs or APUs). Alternative embodiments of the processor 105 may also include more than one processor core 112.

The illustrated cache system includes a level 2 (L2) cache 115 for storing copies of instructions and/or data that are stored in the main memory 110. In the illustrated embodiment, the L2 cache 115 is 8-way associative to the main memory 105 so that each line in the main memory 105 can potentially be copied to and from 8 particular lines (which are conventionally referred to as "ways") in the L2 cache 105. However, persons of ordinary skill in the art having benefit of the present disclosure should appreciate that alternative embodiments of the main memory 105 and/or the L2 cache 115 can be implemented using any associativity including 2-way associativity, 4-way associativity, 16-way associativity, direct mapping, fully associative caches, and the like. Relative to the main memory 105, the L2 cache 115 may be implemented using smaller and faster memory elements. The L2 cache 115 may also be deployed logically and/or physically closer to the CPU core 112 (relative to the main memory 110) so that information may be exchanged between the CPU core 112 and the L2 cache 115 more rapidly and/or with less latency.

The illustrated cache system also includes an L1 cache 118 for storing copies of instructions and/or data that are stored in the main memory 110 and/or the L2 cache 115. Relative to the L2 cache 115, the L1 cache 118 may be implemented using smaller and faster memory elements so that information stored in the lines of the L1 cache 118 can be retrieved quickly by the CPU 105. The L1 cache 118 may also be deployed logically and/or physically closer to the CPU core 112 (relative to the main memory 110 and the L2 cache 115) so that information may be exchanged between the CPU core 112 and the L1 cache 118 more rapidly and/or with less latency (relative to communication with the main memory 110 and the L2 cache 115). One embodiment, the L2 cache 115 may be inclusive of lines in the L1 cache 118 so that the lines stored in the L1 cache 118 are also stored in the L2 cache 115. Persons of ordinary skill in the art having benefit of the present disclosure should appreciate that the L1 cache 118 and the L2 cache 115 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 118 is separated into level 1 (L1) caches for storing instructions and data, which are referred to as the L1-I cache 120 and the L1-D cache 125. Separating or partitioning the L1 cache 118 into an L1-I cache 120 for storing instructions and an L1-D cache 125 for storing data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 120 are replaced with instructions from the L2 cache 115 and the lines in the L1-D cache 125 are replaced with data from the L2 cache 115. However, persons of ordinary skill in the art should appreciate that alternative embodiments of the L1 cache 118 may not be partitioned into separate instruction-only and data-only caches 120, 125.

A cache controller 130 is implemented in the CPU 105 to control and coordinate operation of the caches 115, 118, 120, 125. In the illustrated embodiment, the cache controller 130 is implemented in hardware as part of the L2 cache 115. However, persons of ordinary skill in the art having benefit of the present disclosure should appreciate that in alternative embodiments portions of the cache controller 130 may be implemented in hardware, firmware, software, or any combination thereof. Moreover, the cache controller 130 may be implemented in other locations internal or external to the CPU 105. In the illustrated embodiment, the cache controller 130 is electronically or communicatively coupled to the L2 cache 115, the L1 cache 118, and the CPU core 112. In some embodiments, other elements may intervene between the cache controller 130 and the caches 115, 118, 120, 125 without necessarily preventing these entities from being electronically and/or communicatively coupled as indicated. Moreover, in the interest of clarity, FIG. 1 does not show all of the electronic interconnections and/or communication pathways between the elements in the device 100. Persons of ordinary skill in the art having benefit of the present disclosure should appreciate that the elements in the device 100 may communicate and/or exchange electronic signals along numerous other pathways that are not shown in FIG. 1. For example, information may be exchanged directly between the main memory 110 and the L1 cache 118 so that lines can be written directly into and/or out of the L1 cache 118. The information may be exchanged over buses, bridges, or other interconnections.

In one embodiment, the CPU core 112 implements microcode 135 that can control, coordinate, and in some cases perform operations that may be required by the caches 115, 118, 120, 125. For example, the microcode 135 can signal the cache controller 130 to flush or clean a portion (such as one or more indexes or ways) of the L2 cache 115. Alternatively, the microcode 135 could perform flushing of the L2 cache 115. In one embodiment, the microcode 135 may also be configured to rinse one or more of the caches 115, 118.

In operation, because of the relative memory access latencies of the different entities 110, 115, 118, the CPU 105 first checks the L1 caches 118, 120, 125 when it needs to retrieve or access an instruction or data. If the request to the L1 caches 118, 120, 125 misses, then the request may be directed to the L2 cache 115, which can be formed of a relatively larger and slower memory element than the L1 caches 118, 120, 125. The main memory 110 is formed of memory elements that are larger and slower than the L2 cache 115 and so the main memory 110 may be the object of a request when it receives cache misses from both the L1 caches 118, 120, 125 and the unified L2 cache 115.

The caches 115, 118, 120, 125 can be flushed or cleaned by writing back modified (or "dirty") cache lines to the main memory 110 and invalidating the lines in the caches 115, 118, 120, 125. Cache flushing may be required for some instructions performed by the CPU 105, such as a writeback-invalidate (WBINVD) instruction. Cache flushing may also be used to support powering down the CPU 105 for various power saving states. For example, the cache controller 130 or microcode 135 may flush the L1 cache 118 by writing dirty cache lines into main memory 110. Once flushing of the L1 cache 118 is complete, the cache controller 130 or the microcode 135 may flush the L2 cache 115 by writing dirty cache lines into the main memory 110. Caches 115, 118 may also be "rinsed" by writing back one or more modified or "dirty" cache lines to the main memory 110 and not invalidating the lines that are written back. Rinsing may be performed in the background and typically writes back a few lines in the cache to make these lines "clean," but the other cache values are left in their current states.

The cache controller 130 or the microcode 135 may access or probe the dirty bits for multiple ways of the caches 115, 118 concurrently or in parallel. In one embodiment, the L2 cache 115 may be n-way associative (i.e., each index in the cache is associated with n ways) and so the n dirty bits associated with each index in the L2 cache 115 can be accessed concurrently. For example, a parallel or concurrent read of the dirty bits can be implemented in systems that use flip-flops to store the dirty bits because each flip-flop can be accessed independently and multiple flip-flops can be accessed concurrently or in parallel. For another example, a parallel or concurrent read of the dirty bits can be implemented in systems that use a memory array to store the dirty bits and supply a number of ports to the memory array that is equal to or larger than the number of ways associated with each index.

Figure 2:
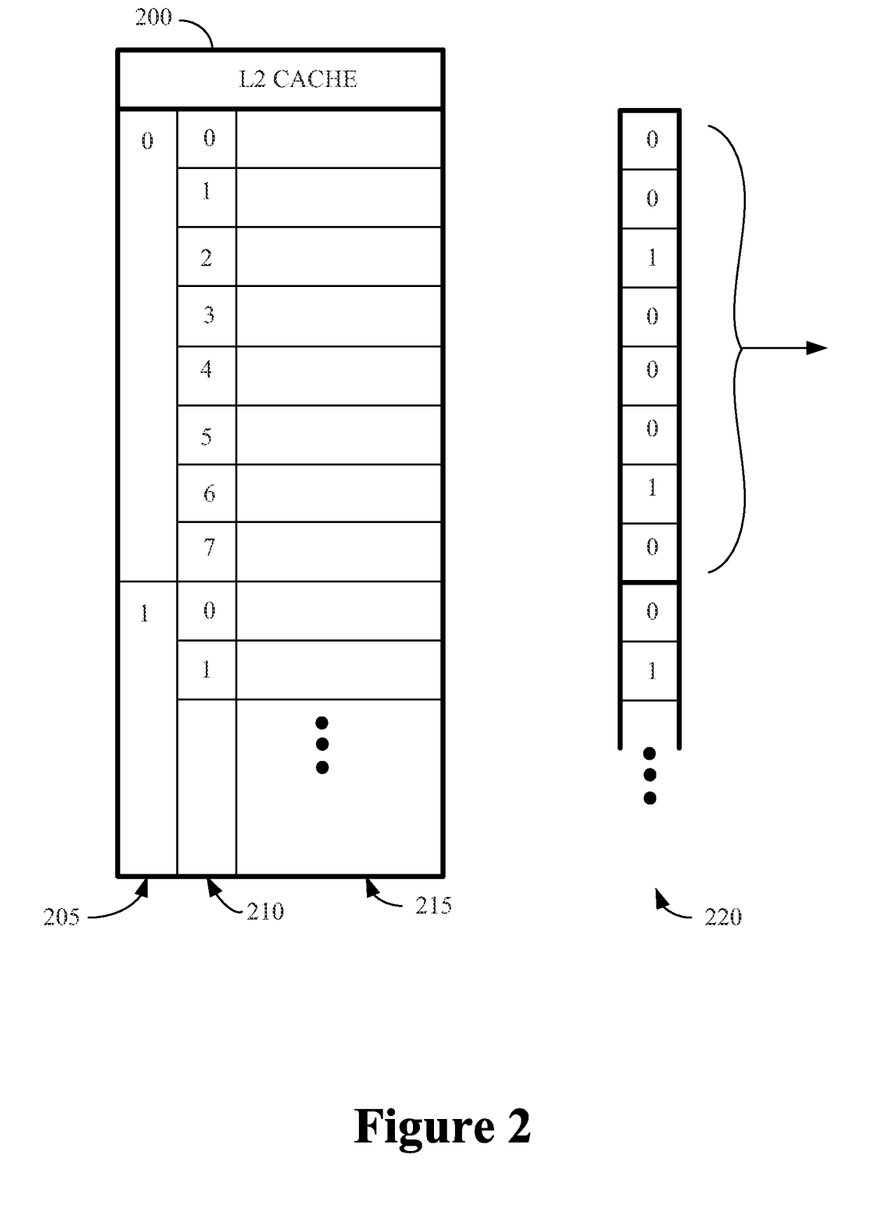
FIG. 2 conceptually illustrates one exemplary embodiment of an L2 cache.

FIG. 2 conceptually illustrates one exemplary embodiment of an L2 cache 200. In the illustrated embodiment, the L2 cache 200 is 8-way associative. The indexes are indicated in column 205 and the ways in the L2 cache 200 are indicated by the numerals 0-8 in the column 210. The column 215 indicates the associated cache lines, which may include information or data. In the illustrated embodiment, each line in the L2 cache 200 has an associated dirty bit 220 that indicates whether the corresponding line is dirty. The dirty bits 220 associated with the ways for each index may be accessed concurrently or in parallel, as discussed herein.

Figure 3:
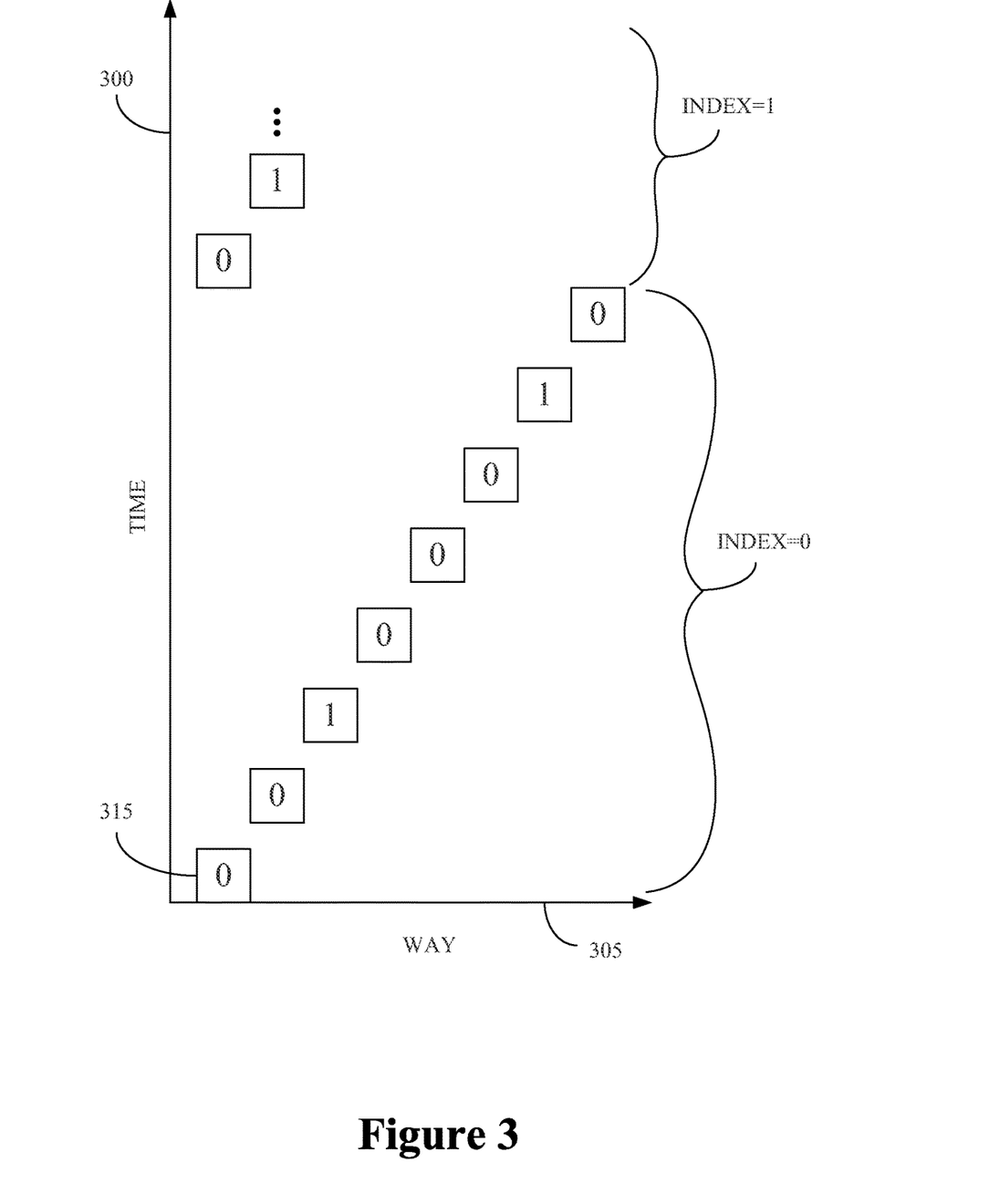
FIG. 3 conceptually illustrates one exemplary embodiment of serial access to dirty bits associated with ways of cache indices.

FIG. 3 conceptually illustrates one exemplary embodiment of serial access to dirty bits associated with ways of cache indices. In the illustrated embodiment, the vertical axis 300 indicates increasing time of access. For example, the accesses may be performed during successive cycles and so each access is performed at a later time corresponding to a subsequent cycle relative to the previous access. Persons of ordinary skill in the art having benefit of the present disclosure should appreciate that the time interval or number of cycles between successive serial accesses is a matter of design choice. The horizontal axis 305 indicates the way corresponding to the dirty bit that is being accessed. In the illustrated embodiment, each box 315 (only one indicated by a numeral in FIG. 3) indicates the value of the dirty bit that is read out in response to a probe of the corresponding index/way. For example, each box 315 may indicate a value of the dirty bit that is read out and stored in a corresponding register.

In the illustrated embodiment, the first serial access is to the dirty bit corresponding to the index/way combination (0, 0) in response to a probe of this way. The value "0" of the dirty bit, which indicates that the cache line at (0, 0) is clean, may be read out, e.g., into a register location. The next serial access is performed during a subsequent time interval or cycle and accesses the dirty bit corresponding to the index/way combination (0, 1). The value "0" of the dirty bit may be read out. The next serial access is performed during a subsequent time interval and accesses the dirty bit corresponding to the index/way combination (0, 2). The value "1" of the dirty bit, which indicates that the cache line at (0, 2) is dirty, may be read out. The probe may cause the corresponding cache line to be invalidated and the cached information in the way to be written back to memory. In that case, the value of the dirty bit may be set to "0" to indicate that the way is clear. Subsequent serial accesses are performed during subsequent time intervals to the indices/ways (0, 3), (0, 4), etc. until all of the ways associated with the index 0 have been accessed. In the illustrated embodiment, all of the ways are probed even though only two of the ways include modified information that needs to be written back to memory, as indicated by the set value of the dirty bit. The serial access technique may then proceed to the next index 1 and serially access the dirty bits to read out the values of the dirty bits corresponding to the ways of index 1.

Figure 4:
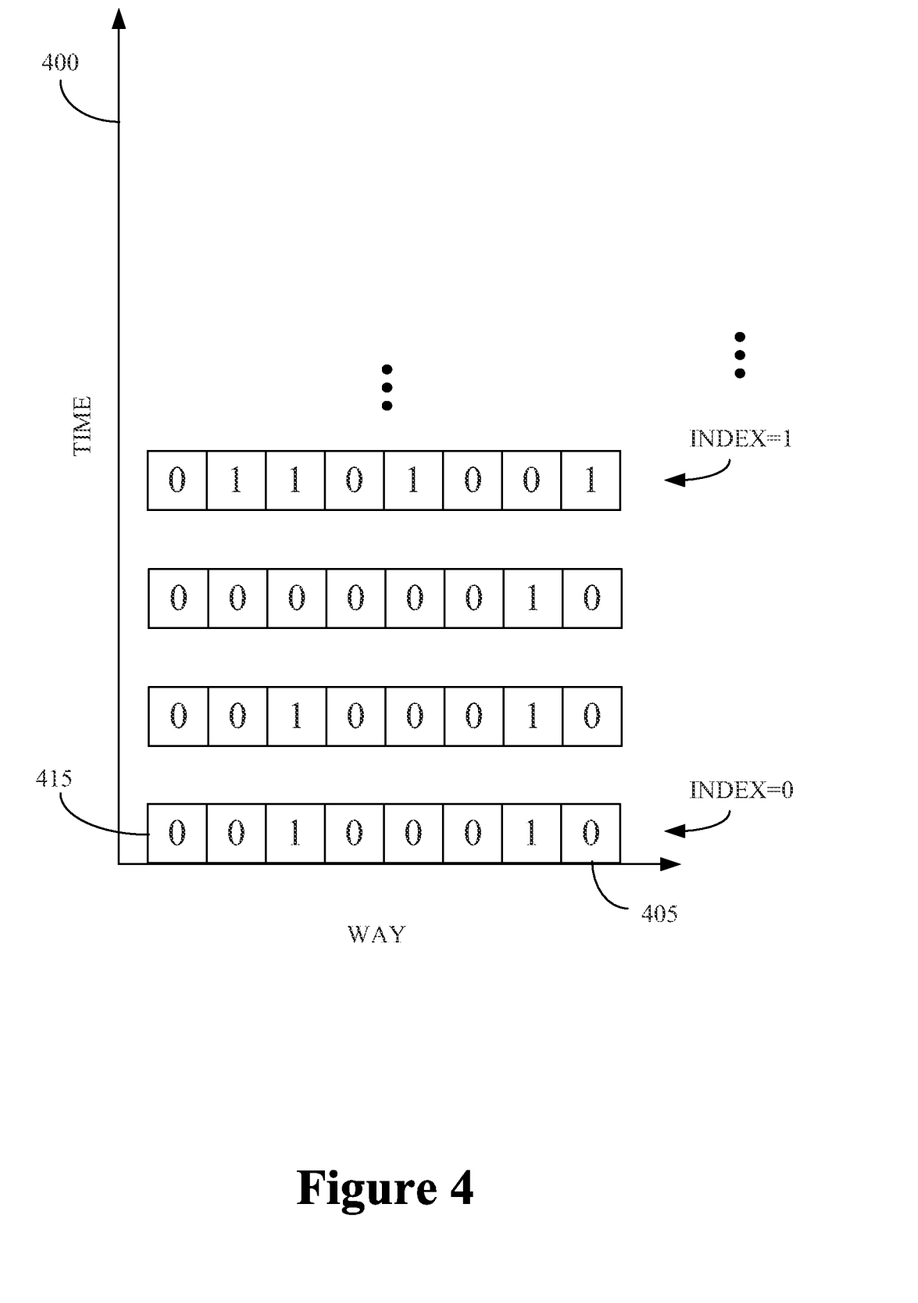
FIG. 4 conceptually illustrates one exemplary embodiment of parallel access to dirty bits associated with ways of cache indices.

FIG. 4 conceptually illustrates one exemplary embodiment of parallel access to dirty bits associated with ways of cache indices. In the illustrated embodiment, the vertical axis 400 indicates increasing time of access. For example, the accesses may be performed during successive cycles and so each access is performed at a later time corresponding to a subsequent cycle relative to the previous access. Persons of ordinary skill in the art having benefit of the present disclosure should appreciate that the time interval or number of cycles between successive parallel accesses is a matter of design choice. The horizontal axis 405 indicates the way corresponding to the dirty bit that is being accessed. In the illustrated embodiment, the set of boxes 415 (only one indicated by a numeral in FIG. 4) indicates the values of the dirty bits for each index that are read out in response to a probe of one of the ways of the corresponding index. For example, each set of boxes 415 may indicate values of the dirty bits that are read out and stored in a corresponding register or registers.

In the illustrated embodiment, the first parallel access is to the dirty bits corresponding to the ways of the index 0 in response to a probe of way 0. The values "00100010" of the dirty bits for the different ways may be read out in parallel, e.g., into a register location. The values of the dirty bits for index 0 indicate that ways 2 and 6 are dirty and the other ways are clean. A next-1 search can be used to identify the next dirty bit that has a set value "1" and then this way (e.g., way 2) may be probed during a subsequent time interval or cycle. The values "00100010" of the dirty bits corresponding to the ways for index 0 are read out in parallel and then the corresponding cache line is invalidated and the cached information in the way may be written back to memory. The value of the dirty bit for way 2 is then set to "0" to indicate that the way is clear. A next-1 search can be used to identify the next dirty bit that has a set value "1" and then this way (e.g., way 6) may be probed during a subsequent time interval or cycle. The values "00000010" of the dirty bits corresponding to the ways for index 0 are read out in parallel and then the corresponding cache line is invalidated and the cached information in the way to be written back to memory. The value of the dirty bit for way 6 is set to "0" to indicate that the way is clear. A subsequent next-1 search would not find any set values of the dirty bits for ways index 0 and so no more probes may need to be performed.

Way 0 of index 1 may then be probed. In response to the probe, the values "01101001" of the dirty bits for the different ways may be read out in parallel, e.g., into a register location that may be the same or different than the register locations used to store the values of the dirty bits for the index 0. As discussed herein, a next-1 search may be used to identify set values of the dirty bits so that only the cache lines corresponding to the set values of the dirty bits are probed. Once the dirty bits have been cleared for the ways of index 1, the parallel access technique may proceed to the next index. Parallel accesses may continue as needed for other indices. The number of probes that are performed for each index may therefore be limited to the number of ways that have set values of the dirty bits plus one extra probe of way 0 in cases where the dirty bit for way 0 has not been set.

Figure 5A:
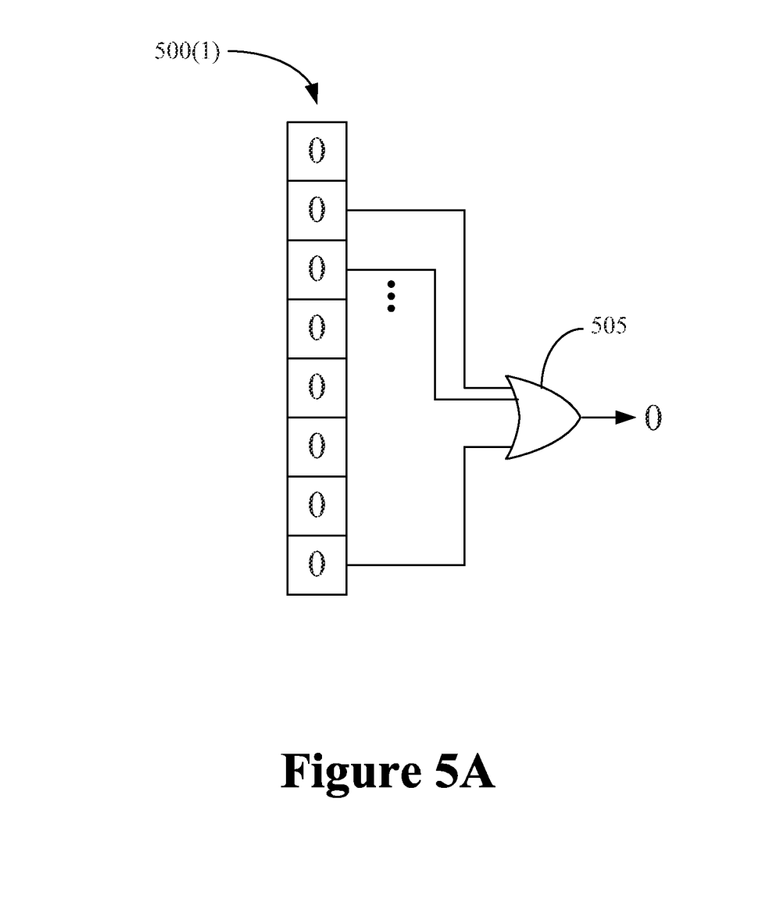
FIGS. 5A, 5B, and 5C conceptually illustrate exemplary embodiments of logic circuits that may utilize values of the dirty bits.
Figure 5B:
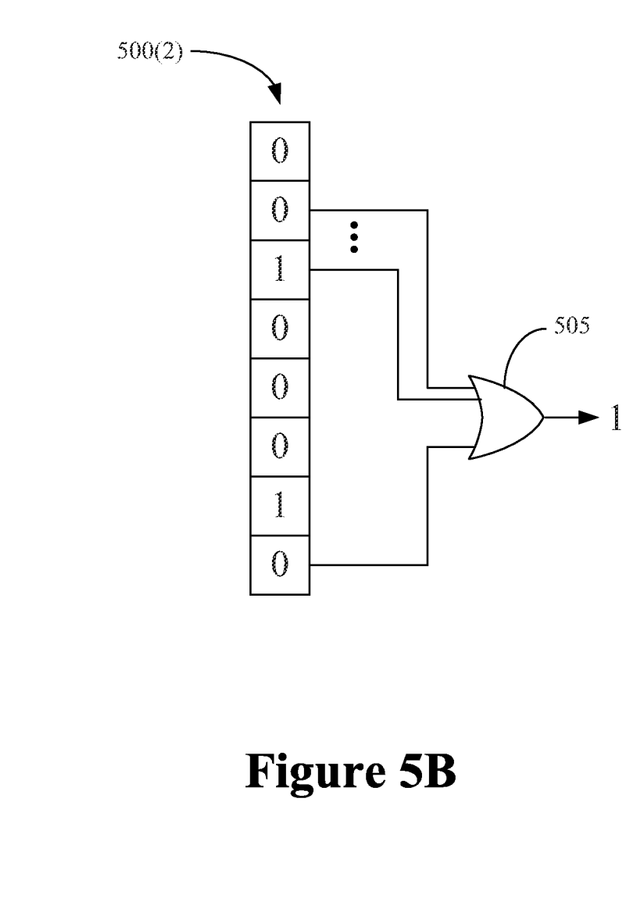
Figure 5C:
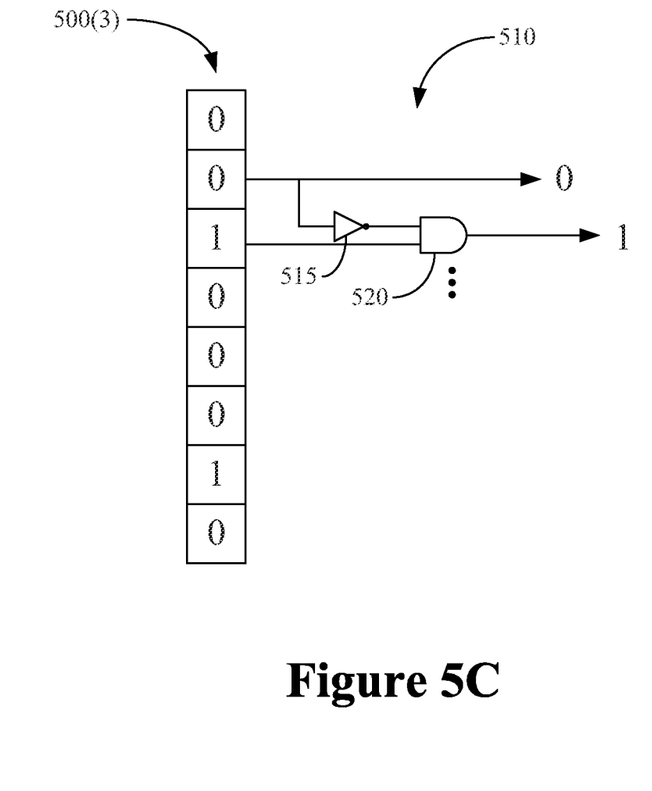

FIGS. 5A, 5B, and 5C conceptually illustrate exemplary embodiments of logic circuits that may utilize values of the dirty bits. In the illustrated embodiment, the values of the dirty bits have been read out in parallel and into the registers 500. The values of the dirty bits in the registers 500 correspond to the dirty bits for the ways 0-7 of a selected index and the values have been read out in response to a probe of one of the ways of the selected index. As discussed herein, the initial probe of the selected index may be set to a default value that probes way 0, regardless of the value of the dirty bit for way 0. Consequently, it may not be necessary in all embodiments to read out the value of way 0 because it can be assumed that the dirty bit for way 0 will be cleared if it was previously set and so the value of way 0 will be 0 following the initial probe regardless of the initial value of the dirty bit. However, in the illustrated embodiment, the dirty bits for all of the ways 0-7 for the selected index are read out into the corresponding registers 500.

FIG. 5A conceptually illustrates circuitry that is used to determine whether any of the dirty bits in the register 500(1) are set. In the illustrated embodiment, the circuitry includes an OR gate 505 that receives input from the registers corresponding to ways 1-7. The value of way 0 is assumed to be 0 in the illustrated embodiment and so it is not necessary to assert this value to an input of the OR gate 505. None of the dirty bits in the register 500(1) are set and so the values asserted to all the inputs of the OR gate 505 are 0 and the output of the OR gate 505 is 0. Since none of the dirty bits in the register 500(1) are set, as indicated by the output of the OR gate 505, the ways 1-7 may not be probed.

FIG. 5B conceptually illustrates circuitry that is used to determine whether any of the dirty bits in the register 500(2) are set. As in the embodiment depicted in FIG. 5A, the circuitry includes an OR gate 505 that receives input from the registers corresponding to ways 1-7. The value of way 0 is assumed to be 0 in the illustrated embodiment and so it is not necessary to assert this value to an input of the OR gate 505. The dirty bits in the register 500(1) corresponding to ways 2 and 6 are set and so the values asserted to some of the inputs of the OR gate 505 are 1 and the output of the OR gate 505 is 1. In this embodiment, the output of the OR gate 505 may be used to trigger additional probes of the ways 2 and 6. For example, "next-1" circuitry can be used to identify the next entry in the register 500(1) that includes a value of 1.

FIG. 5 conceptually illustrates next-1 circuitry 510 that is used to detect the next entry in the register 500(3) that includes a value of 1. In the illustrated embodiment, the value of the dirty bits associated with way 1 is considered the first entry in the register 500(3) and, since the value of the dirty bit associated with way 0 is assumed to be 0, the value in the register entry indicates whether this is the next register entry that includes a value of 1. In the illustrated embodiment, the value of the register entry for way 1 is 0 and so this is not the next register entry that includes a value of 1. The next-1 circuitry 510 includes an inverter 515 and an AND gate 520 that receive values from the register entry for way 1 and the register active array 2, respectively. The output of the inverter 515 is asserted to input of the AND gate 520. The illustrated embodiment the output of the inverter 515 is 1 and the value of the register entry for way 2 is also 1. Consequently, the output of the AND gate 520 is 1, which indicates that the value of the register entry for way 2 is the "next 1."

The next-1 circuitry 510 may also include additional circuitry, e.g. inverters and AND gates, which can be used to signal which of the register entries corresponds to the "next 1." In one embodiment, the circuitry may implement the following logic to identify the "next 1" register entries:

(way 2) AND NOT (way 1).
(way 3) AND NOT (way 2) AND NOT (way 1).
(way 4) AND NOT (way 3) AND NOT (way 2) AND NOT (way 1), etc. . . .

However, persons of ordinary skill in the art having benefit of the present disclosure should appreciate that other logic may alternatively be used to identify the "next 1" register entry and the register 500(3). The logic may be implemented in hardware, firmware, software, or any combination thereof.

Figure 6:
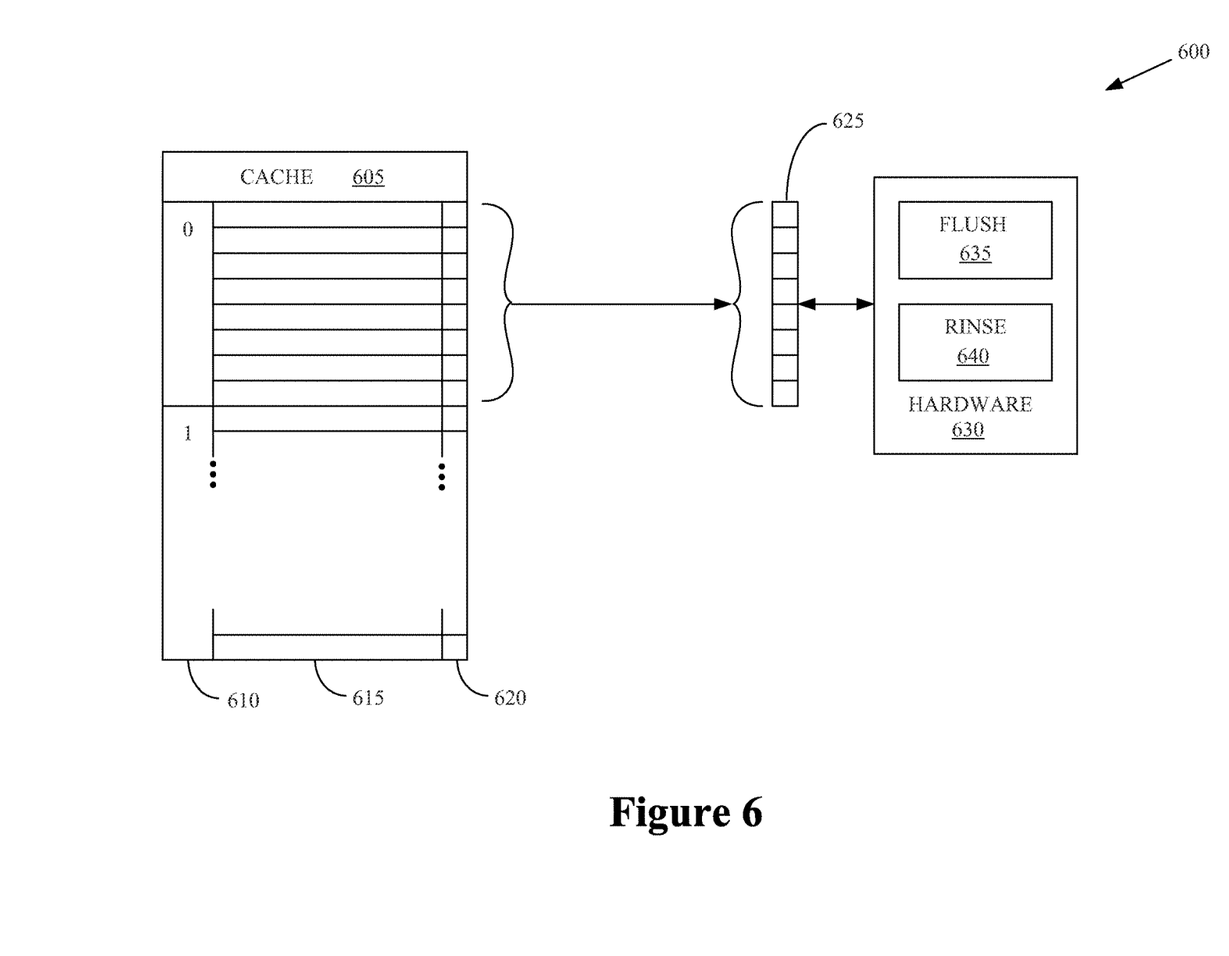
FIG. 6 conceptually illustrates one exemplary embodiment of a processor-based system.

FIG. 6 conceptually illustrates one exemplary embodiment of a processor-based system 600. In the illustrated embodiment, the system includes a cache 605 that is S-way associative. The indexes are indicated in column 610 and the column 615 indicates the associated cache lines, which may include information or data. In the illustrated embodiment, each line in the cache 600 has an associated dirty bit 620 that indicates whether the corresponding line is dirty. The dirty bits 620 associated with the ways for each index may be accessed concurrently or in parallel, as discussed herein. For example, the dirty bits associated with the index 0 may be read out in parallel in response to a probe to one of the ways of the index 0. The values of the dirty bits may be stored in one or more registers 625.

In the illustrated embodiment, the system 600 includes hardware 630 that can be configured to flush different cache lines 615 in the cache 605. For example, the hardware 630 shown in FIG. 6 includes flush logic 635 for writing back one or more modified cache lines that are indicated by the set values of the dirty bits 620. Cache line 615 may then be invalidated by the flush logic 635. As discussed herein, the values of the dirty bits 620 may be used to skip over clean lines so that only lines that have set values of the dirty bits 620 are probed. The illustrated embodiment of the hardware 630 also includes rinse logic 640 that may "rinse" the cache 605 by writing back one or more of the dirty cache lines 615 to the main memory, marking these lines as "clean," and not invalidating the lines that are written back. Rinsing may be performed in the background and typically writes back a few lines in the cache to make these lines clean, but the other cache values are left in their current states. Persons of ordinary skill in the art having benefit of the present disclosure should appreciate that the flush or rinse processes may alternatively be implemented in hardware, firmware, software, or combinations thereof including implementations in microcode.

Figure 7:
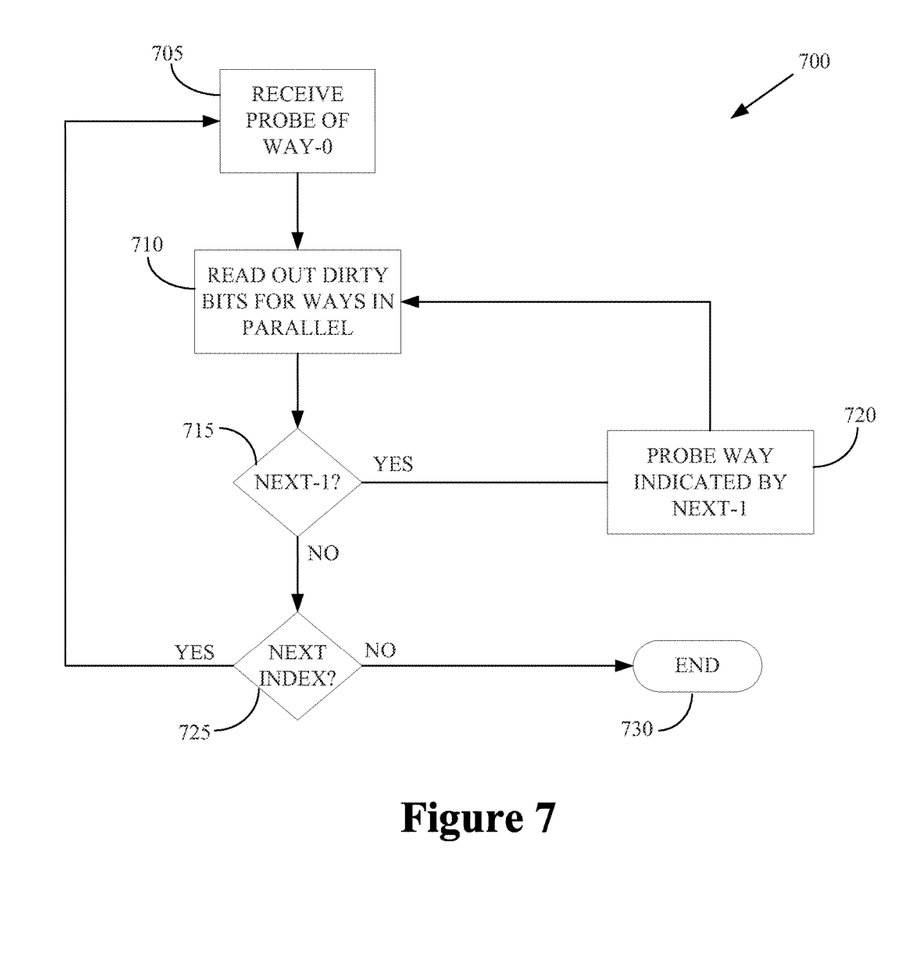
FIG. 7 conceptually illustrates one exemplary embodiment of a method of probing the ways associated with an index in a cache.

FIG. 7 conceptually illustrates one exemplary embodiment of a method 700 of probing the ways associated with an index in a cache. In the illustrated embodiment, a probe is received (at 705) to way 0 of one index of the cache. Dirty bits for the ways of the probe index are then read out (at 710) in parallel and may be stored at one or more registers. Circuitry may then identify (at 715) a "next-1" entry in the registers that include the dirty bits for the index. If a "next-1" entry is identified, then the way indicated by the set value of the dirty bit in the "next-1" entry may be probed (at 720). Values of the dirty bits for the ways of the index may then be read out ((at 710) in response to the probe (at 720). If a "next-1" entry is not identified (at 715) in response to any of the probes, then the method 700 may move to the next index if another next index is available (at 725) in the cache. Otherwise, the method 700 may end (at 730).

Embodiments of processor systems that can access dirty bits in parallel or concurrently as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarising, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
   a cache configurable to store a plurality of lines, wherein the lines are grouped into a plurality of subsets of the plurality of lines;
   a plurality of dirty bits associated with the plurality of lines;
   first circuitry configurable to concurrently access the plurality of dirty bits associated with at least one of the subsets of the plurality of lines;
   a register that stores values concurrently accessed from the plurality of dirty bits; and
   microcode configurable to access the register and identify dirty cache lines based on a logical combination of the values stored in register; wherein the microcode is further configurable to clean or rinse the cache by writing dirty cache lines back to memory.

2. The apparatus of claim 1, wherein the subsets are associated with a corresponding plurality of indices of the cache, and wherein the lines in the subsets correspond to ways of the cache.

3. The apparatus of claim 2, wherein said first circuitry is configurable to concurrently access the dirty bits associated with ways of at least one index of the cache.

4. The apparatus of claim 3, wherein said first circuitry is configurable for parallel access to the dirty bits associated with the ways of said at least one index.

5. The apparatus of claim 1, comprising a plurality of flip-flops to be concurrently accessed for storing the plurality of dirty bits.

6. The apparatus of claim 1, further comprising logic to combine the concurrently accessed plurality of dirty bits to determine a status of the subset of lines.

7. The apparatus of claim 1, further comprising circuitry to select one of the plurality of lines to probe based on a logical combination of the accessed plurality of dirty bits.

8. An apparatus, comprising:
   means for storing a plurality of lines, wherein the lines are grouped into a plurality of subsets of the plurality of lines;
   means for storing values of a plurality of dirty bits associated with the plurality of lines;
   means for concurrently accessing the plurality of dirty bits associated with at least one of the plurality of subsets of the plurality of lines;
   a register for storing values concurrently accessed from the plurality of dirty bits, and
   microcode configurable to access the register and identify dirty cache lines based on a logical combination of the values stored in register, wherein the microcode is further configurable to clean or rinse the cache by writing dirty cache lines back to memory.

9. A method, comprising:
   storing a plurality of lines in a cache, wherein the lines are grouped into a plurality of subsets of the plurality of lines;
   storing values of a plurality of dirty bits associated with the plurality of lines; and
   concurrently accessing the values of the plurality of dirty bits associated with at least one of the plurality of subsets of the plurality of lines
   storing values of the dirty bits read into a register;
   accessing the values of the dirty bits stored in said at least one register and identifying dirty cache lines based upon a logical combination of the values stored in the register; and
   cleaning or rinsing the cache by writing dirty cache lines back to memory.

10. The method of claim 9, wherein the subsets are associated with a corresponding plurality of indices of the cache, and wherein the lines in the subsets correspond to ways of the cache, and wherein concurrently accessing the values of the dirty bits comprises concurrently accessing values of the dirty bits associated with ways of at least one index of the cache.

11. The method of claim 10, wherein concurrently accessing the values of the dirty bits comprises accessing, in parallel, the dirty bits associated with the ways of said at least one index.

12. The method of claim 9, further comprising logically combining the accessed values to determine a status of the at least one of the plurality of subsets of the plurality of lines.

13. The method of claim 9, further comprising further comprising selecting one of the plurality of lines to probe based on a logical combination of the accessed plurality of dirty bits.

14. A non-transitory computer-readable storage medium including instructions that when executed can configure a manufacturing process used to manufacture a semiconductor device comprising:
- a cache configurable to store a plurality of lines, wherein the lines are grouped into a plurality of subsets of the plurality of lines;
- a plurality of dirty bits associated with the plurality of lines; and
- first circuitry configurable to concurrently access the plurality of dirty bits associated with at least one of the subsets of the plurality of lines;
- a register that stores values concurrently accessed from the plurality of dirty bits; and
- microcode configurable to access the register and identify dirty cache lines based on a logical combination of the values stored in register wherein the microcode is further configurable to clean or rinse the cache by writing dirty cache lines back to memory.

* * * * *

UNITED STATES PATENT AND TRADEMARK OFFICE
CERTIFICATE OF CORRECTION

PATENT NO. : 9,940,247 B2
APPLICATION NO. : 13/533253
DATED : April 10, 2018
INVENTOR(S) : William L. Walker Page 1 of 1

It is certified that error appears in the above-identified patent and that said Letters Patent is hereby corrected as shown below:

In the Claims

At Column 13, Line 9, please delete "lines; and" and substitute --lines;--

At Column 13, Line 17, please correct "in register wherein the" and substitute --in register, wherein the--

Signed and Sealed this
Tenth Day of December, 2019

Andrei Iancu
*Director of the United States Patent and Trademark Office*